United States Patent
Wang et al.

(10) Patent No.: US 11,392,724 B2
(45) Date of Patent: Jul. 19, 2022

(54) METHOD FOR ACCELERATING EXECUTION OF APPLICATION IN A TRUSTED EXECUTION ENVIRONMENT

(71) Applicant: City University of Hong Kong, Kowloon (HK)

(72) Inventors: Cong Wang, Shatin (HK); Helei Cui, Fo Tan (HK); Huayi Duan, Hunghom (HK)

(73) Assignee: City University of Hong Kong, Kowloon (HK)

(*) Notice: Subject to any disclaimer, the term of this patent is extended or adjusted under 35 U.S.C. 154(b) by 906 days.

(21) Appl. No.: 15/849,889

(22) Filed: Dec. 21, 2017

(65) Prior Publication Data

US 2019/0197260 A1    Jun. 27, 2019

(51) Int. Cl.
*G06F 21/72* (2013.01)
*G06F 21/60* (2013.01)
*G06F 21/57* (2013.01)

(52) U.S. Cl.
CPC .............. *G06F 21/72* (2013.01); *G06F 21/57* (2013.01); *G06F 21/606* (2013.01)

(58) Field of Classification Search
CPC ......... G06F 21/72; G06F 21/57; G06F 21/606
See application file for complete search history.

(56) References Cited

U.S. PATENT DOCUMENTS

| | | | |
|---|---|---|---|
| 7,069,545 B2 | 6/2006 | Wang et al. | |
| 8,199,911 B1 | 6/2012 | Tsaur et al. | |
| 8,453,135 B2 | 5/2013 | Zaafrani | |
| 8,959,332 B2 | 2/2015 | Augnestein et al. | |
| 9,361,078 B2 | 6/2016 | Gao | |
| 9,495,552 B2 | 11/2016 | El-Shimi et al. | |
| 2003/0163433 A1* | 8/2003 | Lam | H04L 63/06 705/71 |
| 2012/0140923 A1* | 6/2012 | Lee | H04L 9/0894 380/45 |
| 2017/0031976 A1* | 2/2017 | Chavan | G06F 16/23 |
| 2018/0114013 A1* | 4/2018 | Sood | G06F 21/572 |

FOREIGN PATENT DOCUMENTS

CN    104601563    5/2015

OTHER PUBLICATIONS

Allan Heydon et al Caching Function Calls using precise dependencies. In Proc. of ACM PLDI.ACM, 2000.

(Continued)

*Primary Examiner* — Jeffrey D. Popham
(74) *Attorney, Agent, or Firm* — Renner Kenner Greive Bobak Taylor & Weber

(57) ABSTRACT

A method for accelerating execution of application in a trusted execution environment includes generating a tag based on computer instructions associated with a function of an application and input data, for representation of a computation to be performed by the application; determining whether the tag correspond to an entry in a database having one or more entries of tag and one or more corresponding computation result; and retrieving a corresponding computation result from the database without performing the computation if a corresponding entry of the tag is found in the database.

8 Claims, 8 Drawing Sheets

(56) References Cited

OTHER PUBLICATIONS

Pradeep Kumar Gunda et al Nectar: Automatic Management of Data and Computation in Datacenters In Proc. of USENIX OSDI. USENIX, 2010.
Pramod Bhatotia et al Incoop: MapReduce for Incremental Computations In Proc. of ACM SoCC. ACM, 2011.
Yang Tang et al Secure Deduplication of General Computations In Proc. of USENIX ATC. USENIX, 2015.

* cited by examiner

```
// original function call
int ret = deflate(&strm, flush);

// modified function call with support of computation deduplication
Deduplicable<int, z_stream*, int> dedup_deflate("zlib","1.2.11","deflate");

int ret = dedup_deflate(&strm, flush);
```
Case 1

```
// original function call
int rc = pcre_exec(regex, NULL, str, str_len, 0, 0, ovector, osize);

// modified function call with support of computation deduplication
Deduplicable<int, const pcre*, const pcre_extra*, const char*, int, int,
int, int*, int> dedup_pcre_exec("libpcre", "10.23", "pcre_exec");

int rc = dedup_pcre_exec(regex, NULL, str, str_len, 0, 0, ovector, osize);
```
Case 2

Figure 4

METHOD FOR ACCELERATING EXECUTION OF APPLICATION IN A TRUSTED EXECUTION ENVIRONMENT

TECHNICAL FIELD

The invention relates to a method for accelerating execution of application in a trusted execution environment and its related system.

BACKGROUND

Recent advances and commoditization of hardware-assisted security technology (e.g., Intel® Software Guard Extensions SGX) has shown great potential in hardening a wide range of network applications, such as content-based routing, software-defined networking, anonymity network, middleboxes, etc. Unlike software-centric approaches relying on customized cryptographic primitives, hardware-assisted designs establish trusted execution environment, called enclaves, for running arbitrary application code over sensitive data at processor speed. Also, the trusted computing base (TCB) only covers the processor and the code inside enclaves; thus, the confidentiality and integrity of code and data are preserved even if the operating system (OS) and the hypervisor are compromised.

In the deployment of today's network applications, the trending technology, network function virtualization (NFV), can be used to reduce management cost and improve on-demand scaling by virtualization. This provides an opportunity to allow different network applications to run on shared physical machines, especially with the support of commodity hardware enclaves. While this approach is promising, it may still suffer from potential performance issues due to relatively limited secure resources and ever-increasing workload to be put into the trusted enclaves.

Various methods have been proposed to accelerate applications inside trusted enclaves. Examples include the use of exit-less system calls and the use of user-space memory management. While these system level optimizations may work effectively, there remains a need to further accelerate network applications in commodity trusted execution environments.

SUMMARY OF THE INVENTION

In accordance with a first aspect of the invention, there is provided a method for accelerating execution of application in a trusted execution environment, comprising: generating a tag based on computer instructions associated with a function of an application and input data, for representation of a computation to be performed by the application; determining whether the tag correspond to an entry in a database having one or more entries of tag and one or more corresponding computation result; and retrieving a corresponding computation result from the database without performing the computation if a corresponding entry of the tag is found in the database. In some embodiments, one tag entry corresponds to one computation result.

In some embodiments, the method further comprises performing the computation if a corresponding entry of the tag is not found in the database.

In some embodiments, the method further comprises storing the computed result and the corresponding tag in the database.

In some embodiments, the corresponding computation result is stored separately from the tag in the database.

In some embodiments, the corresponding computation result is stored outside an enclave of the database and the tag is stored inside the enclave of the database. Alternatively, the tag and its corresponding computation result are stored inside the enclave of the database.

In some embodiments, the method further comprises encrypting the computed result.

In some embodiments, the computed result is encrypted with a random encryption key.

In some embodiments, the method further comprises encrypting the random encryption key with a further encryption key.

In some embodiments, the database is encrypted.

In some embodiments, the method further comprises sending the generated tag to the database via a secured channel.

In some embodiments, the database includes metadata associated with the tag and corresponding computation result.

In some embodiments, the corresponding computation result in the database is in the form of ciphertext.

In some embodiments, the corresponding computation result in the database is encrypted.

In some embodiments, the method further comprises recovering a decryption key for decrypting the corresponding computation result.

In some embodiments, the method further comprises decrypting the corresponding computation result.

In some embodiments, the application comprises an SGX-enabled application.

In some embodiments, the trusted execution environment comprises an SGX-enabled environment.

In some embodiments, the trusted execution environment comprises one or more enclaves.

In accordance with a second aspect of the invention, there is provided a system for accelerating execution of application in a trusted execution environment, comprising: means for generating a tag based on computer instructions associated with a function of an application and input data, for representation of a computation to be performed by the application; means for determining whether the tag correspond to an entry in a database having one or m more entries of tag and one or more corresponding computation result; and means for retrieving a corresponding computation result from the database without performing the computation if a corresponding entry of the tag is found in the database.

In accordance with a third aspect of the invention, there is provided a non-transitory computer readable medium for storing computer instructions that, when executed by one or more processors, causes the one or more processors to perform a method for accelerating execution of application in a trusted execution environment, comprising: generating a tag based on computer instructions associated with a function of an application and input data, for representation of a computation to be performed by the application; determining whether the tag correspond to an entry in a database having one or more entries of tag and one or more corresponding computation result; and retrieving a corresponding computation result from the database without performing the computation if a corresponding entry of the tag is found in the database.

In some embodiments, the non-transitory computer readable medium is further arranged to perform the method in the first aspect.

BRIEF DESCRIPTION OF THE DRAWINGS

Embodiments of the invention will now be described, by way of example, with reference to the accompanying drawings in which:

FIG. 4 shows codes used in traffic compression in bandwidth optimizer via zlib (case 1) and pattern matching in intrusion detection system via libprce (case 2) (the function signature is passed as templates parameters) in one embodiment of the invention;

DETAILED DESCRIPTION

Figure 8:
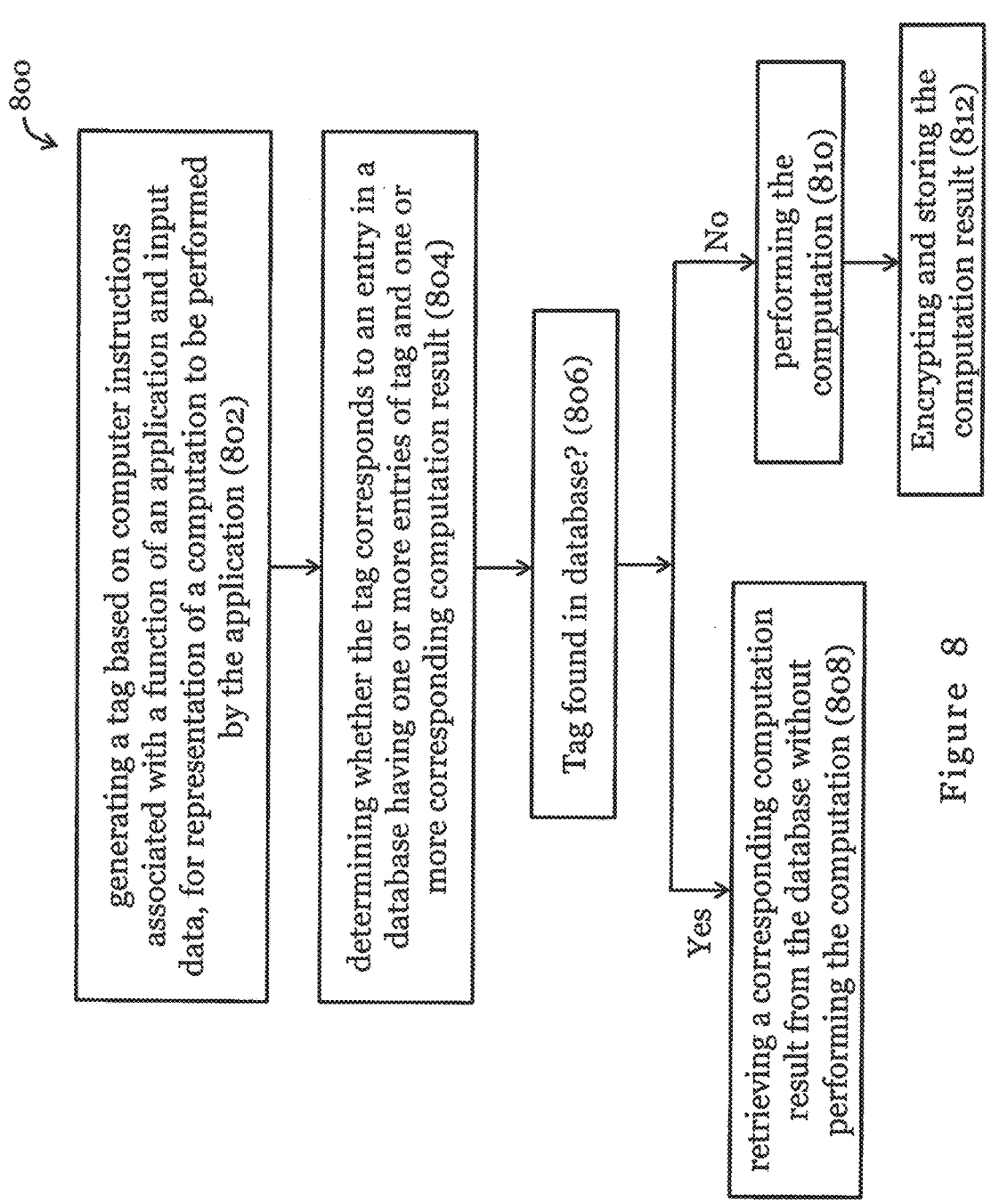
FIG. 8 is a flow diagram illustrating a general method for accelerating execution of application in a trusted execution environment in one embodiment of the invention.

Referring to FIG. 8, there is shown a method 800 for accelerating execution of application in a trusted execution environment in one embodiment of the invention. The method includes, in step (802), generating a tag based on computer instructions associated with a function of an application and input data, for representation of a computation to be performed by the application. Then in steps (804) and (806), the method determines whether the tag corresponds to an entry in a database having one or more entries of tag and one or more corresponding computation result. If the tag is found in the database, then the method proceeds to step (808), to retrieve the corresponding computation result from the database without performing the computation. If, however, the tag is not found in the database, then the method proceeds to step (810), to perform the computation. After performing the computation, the computation result will be encrypted and then stored, as in step (812). Details of the method 800 will become apparent by referring to the following description.

I. OVERVIEW

A. System Overview

Figure 1:
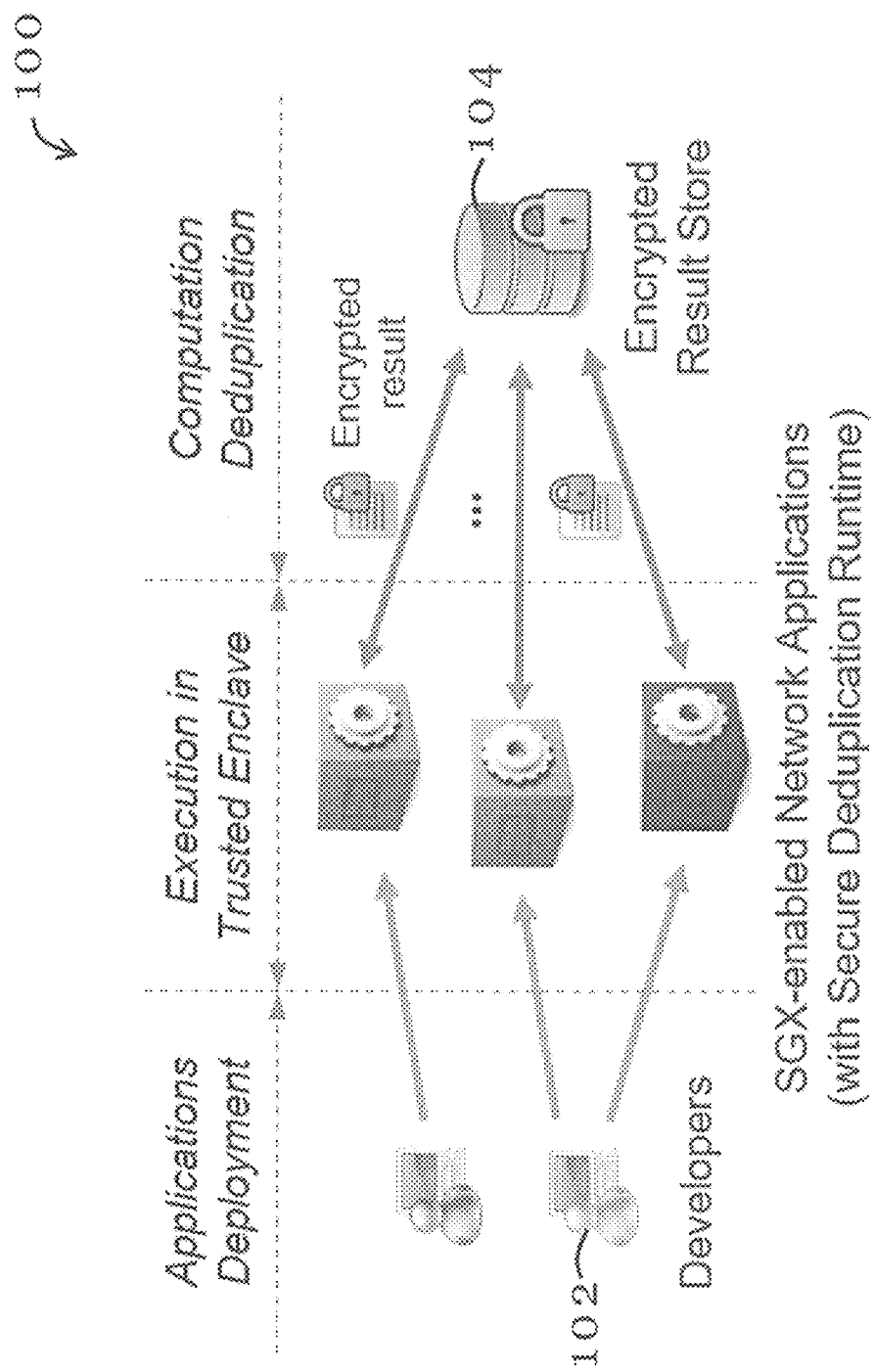
FIG. 1 is a schematic diagram illustrating a system implementing a method for accelerating execution of application in a trusted execution environment in one embodiment of the invention.

FIG. 1 illustrates workflow in a deduplication system 100 for application acceleration in one embodiment of the invention. The system 100 generally includes: network application developer 102, network application with secure deduplication runtime ("DedupRuntime"), and encrypted result store 104 ("ResultStore"). In order to improve the security and privacy of network applications, developers first harden their applications with hardware-assisted security technologies (e.g., Intel® SGX). Next, these network applications will be deployed on physical or even virtual machines (e.g., NFV infrastructure enables flexible deployment of middleboxes as virtual appliances running on general hardware) with the support of hardware enclaves. The applications will then be run in the trusted execution environments.

In system 100, it is relatively easy to find repeated or overlapped computations among various network applications, e.g., deep packet inspection may occur repeatedly over redundant network traffic at one or multiple outsourced middlebox(es). Accordingly, if a particular computation is deterministic yet time-consuming (e.g., the underlying algorithm(s) is computational complex, the input size is relatively large), it would be more efficient to cache and reuse the same and usually smaller-sized result rather than re-computing it.

In the present embodiment, when implementing a network application, the developer needs to mark those computations by modifying the function calls with a developer-friendly and expressive API of the invention. When the marked function is reached after or towards the end of running of the application, the secure DedupRuntime, which is associated with the application and responsible for duplicate checking, will first generate a tag from the combination of the function's code and input data to represent the computation. Then the tag will be sent to an encrypted ResultStore, which manages previous computation results, to check whether the computation has been done before. If it is determined that the computation has not been done before, it means that the result of the target computation has not been stored yet and so the application will compute the result then encrypt it properly with DedupRuntime, and eventually store it at the encrypted ResultStore. Otherwise, if it is determined that the computation has been done before, the corresponding result will be decrypted and reused directly without having to repeat the computation.

For ease of presentation, in this embodiment, result func (input) is used to represent a generic computation, where "func" implies the actual code of the function, and the parameter is also viewed as part of the input data.

B. Threat Model and Assumptions

In the present example, it is assumed that a powerful adversary who has the ability to control the software stack of physical machines, including hypervisor and OS, is unable to compromise the trusted hardware enclaves and relevant enclave keys. Particularly, it can exploit vulnerability in the kernel or gain root access to the OS to observe and modify the encrypted results outside the trusted enclaves. It may also attempt to obtain the result via a piece of short information about a computation, explicitly the tag derived originally from its underlying function and input.

In the present example, it is further assumed that the network application developers will use the software framework of the invention correctly and will focus on the common computations with deterministic results. The integrity of an application has also been correctly verified prior to running with hardware enclaves so that the result will be correctly computed inside the enclaves. This can be achieved by the attestation mechanism of Intel® SGX.

C. Design Goals

Confidentiality and Integrity

In the framework of the present embodiment, the function's code, input data, and computation results are protected even after they have left the protected memory boundary of the original trusted enclave. Note that by using the deduplication framework of the present embodiment, an application will inevitably know whether an intended computation has been done before. Yet, it is necessary to ensure that this is the only information known to it beyond the computation result. ResultStore is also aware of such deduplication result. Also the stored computation result should only be available to the application that can indeed perform the computation.

Generality and Extensibility

The framework in the present embodiment is designed and implemented in a function-agnostic way with a uniform serialization interface, so as to be compatible with different functions intended for deduplication. Meanwhile, to support a new function, the developer's effort can be minimized by allowing he/she to create a "deduplicable" version of the function via an easy-to-use wrapper API of the invention. These are important because significant re-implementing of the network applications would definitely reduce the usability of the design of the present invention.

D. Preliminaries

Hardware Enclaves

The recent advance in hardware enclaves of computer processor makes it possible to execute arbitrary computations at processor speeds without requiring trust in anything but the processor and the application. Despite the underlying implementations varying among different platforms (e.g., Intel® SGX and AMD® Memory Encryption), they all provide isolated execution environments. That is, a running enclave is protected by the processor, where its memory cannot be read or wrote by other processes on the same processor outside the enclave, not even the OS and hypervisor. Without losing generality, the present embodiment is arranged to operate with Intel® SGX but it should be noted that the invention, in other embodiments, may also be compatible with other platforms such as IBM SecureBlue++™.

Message-Locked Encryption (MLE)

Message-locked encryption (MLE) is originally formalized for ensuring data confidentiality in secure data deduplication, where the ciphertexts of unpredictable messages cannot be distinguished by an efficient attacker except with negligible probability. In brief, MLE ensures that the same data always result in identical tags for the use of duplicate checking, where the ciphertext could be randomized in some constructions, e.g., randomized convergent encryption (RCE).

II. DESIGN DETAILS

A. Design Intuition

The method in the embodiment of the invention concerns how to accelerate computations of network applications inside the trusted execution environments (i.e., hardware enclaves) via securely reusing previous computation results, where these results are well protected and can be accessed by eligible applications that indeed perform the same computations, i.e., owning the same function's code and input data. As mentioned, the method in the present embodiment focuses on the common computations either in a single network application or among different ones, where the computation can be viewed as a combination of code (of a particular function) and input data, i.e., func(input). Hence unlike conventional data deduplication in which the redundant copies can be identified via the hash of the data only, in the present embodiment, the determination of whether two computations are identical requires consideration of both the function itself and its input data.

Figure 2:
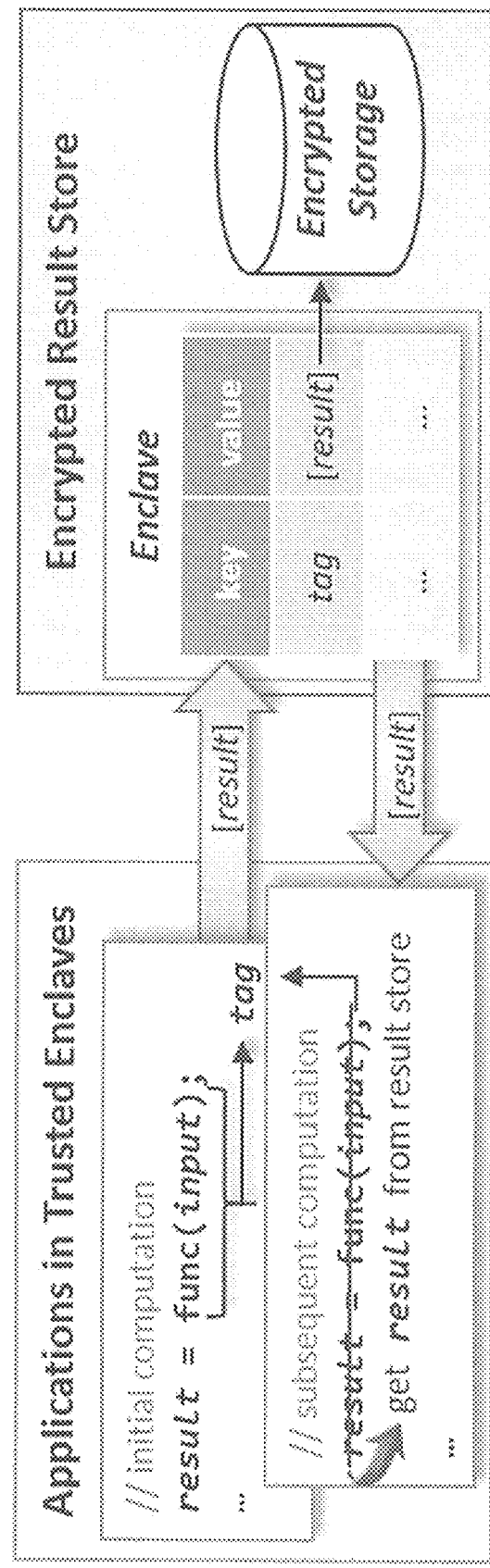
FIG. 2 is a schematic diagram illustrating a method for accelerating execution of application in a trusted execution environment in one embodiment of the invention.

In this direction, consider how to make the application aware of these redundant computations during its runtime (i.e., deduplication occurs before actually calling the underlying functions). As is often the case, calling a popular function from a third-party library within different applications or even a self-defined but reusable function within a single application may cause redundant computations when facing the same input data. Therefore, when implementing an SGX-enabled application, the developer should be able to mark those potentially common computations with a generic software framework, which contains: a secure DedupRuntime for transparently handling the underlying deduplication operations and a generic encrypted ResultStore for result management. Later, when the application starts to run, DedupRuntime can intercept the marked computation and query ResultStore with a tag derived from the combination of the function's code and input for duplicate checking, as shown in FIG. 2. It should be noted that in the present embodiment, two computations are considered duplicates if their tags are identical.

Regarding the reusable results managed by ResultStore, it is advisable to store them outside the enclaves rather than inside due to the limited protected memory resource. Thus, there is a need to consider how to protect these valuable results and make them available to applications that perform the same computation. Remarkably, with the strong protection of hardware enclaves, the confidentiality and integrity of computation results can be guaranteed, where they are encrypted and authenticated before leaving the trusted environment. Thus, in one embodiment, the method includes sharing a system-wide secret key among all trusted applications. However, this approach might be vulnerable to a potential single point of compromise.

To resolve this tension, there is a need for an encryption scheme, of which the key is derived from computation itself; hence the application that performs the same computation can recover the key without agreeing on a single key in advance. In one embodiment, MLE is used as an encryption scheme, which enables subsequent uploaders to derive the same encryption key from the same data. However, as MLE was originally designed for secure data deduplication, there is a need to modify it to ensure that it is suitable for computation deduplication and compatible with the standard encryption scheme in SGX (more details in Section II-C). In the following example, a single secret key is used for the result encryption, regardless of the number of applications that can access the encrypted ResultStore.

B. Basic Design

In one embodiment, for ease of exposition, the method begins with a basic design to introduce the general procedure of the computation deduplication framework of the present embodiment. In order to store these reusable results outside enclaves, the reusable results will be encrypted with a secret key k before leaving the originally trusted enclaves, and later they can be utilized by the same application or others as long as it owns the same key. A standard authenticated encryption scheme, e.g., AES in GCM mode, which provides data confidentiality as well as integrity is used as an encryption scheme of the present embodiment. To simplify presentation, in the following, [res] is used to represent the result ciphertext, which covers its authentication code and initialization vector.

Major routine of the computation deduplication design in the present embodiment during the runtime of a deployed network application is now described.

Specifically, prior to actually running a computation func (m) marked by the developer, the secure DedupRuntime of the application first generates a hash tag t from the combination of the function's code and its input data in, i.e., t←Hash (func, in), where Hash (.) is a collision-resistant hash function, e.g., SHA-256. Then t is sent to the encrypted ResultStore via a secure channel for duplicate checking.

To record those reusable results, the encrypted ResultStore maintains a metadata dictionary D in enclave, where the key is the tag t and the value is the corresponding result ciphertext [res]. Particularly, the actual content of [res] is stored outside enclave for space efficiency, just keeping a pointer in the metadata dictionary. So, if the target computation has not been done before, i.e., null←D.get(t), then the application will execute the function with its input, and obtain the result, i.e., res←func(m). Later, the result will be encrypted with the key k, i.e., [res]←AES.Enc(k, res), and sent to ResultStore for updating the metadata dictionary, i.e., D.add (t, res). Otherwise, if ResultStore can locate the corresponding result, i.e., [res]←D.get(t), then the application owning the key k can directly obtain the result via [res]←AES.Dec(k, [res]).

In some applications, the single key design may be useful when targeting the repeated computations within a single application. However, it is not robust enough when deduplicating the redundant computations among multiple applications, because agreeing on a single secret key will make the involved applications extremely brittle in the case of a single point of compromise. To address this issue, a method of the present embodiment, with an efficient encryption scheme that does not require to sharing a key for deduplication purpose, is presented below.

C. Support Cross Application Computation Deduplication

In order to maximize the utilization of those reusable results, in the present embodiment, they are made available to all eligible applications without sharing a system-wide secret key in advance. To achieve this, the present embodiment resort to a more efficient construction of MLE, i.e., RCE, and make it compatible with the standard encryption scheme in SGX. Briefly, the encryption procedure in RCE is accomplished by first picking a random symmetric encryption key and then encrypting the message with that key. Finally, this message encryption key is encrypted with another key, which is derived from the message, as a one-time pad. The detailed procedures of handling the initial computation and the subsequent computation are shown in Algorithm 1 and Algorithm 2 respectively.

---

Algorithm 1 Initial Computation in Our Main Design

---

Input:  A computation func(m) in an application,
where m is the input data; and a metadata
dictionary $\mathcal{D}$ managed by the encrypted
ResultStore.
Output: Computation result res, and updated D.
Inside the enclave of an application:
1: t ← Hash (func, m);
2: Send t to the encrypted ResultStore via a secure channel;
3: Obtain false as the response, which indicates the result of the target computation has not been stored yet, i.e., null ← $\mathcal{D}$. get (t);
4: res ← func (m) ;           // Compute the result
5: Pick a randomness $r \xleftarrow{R} \{0,1\}^*$;
6: h ← Hash (func, m, r);
7: k ← AES.KeyGen($1^\lambda$);
8: [res] ← AES.Enc (k, res);  // Encrypt the result
9: [k] ← k ⊕ h;               // Protect the key
10: Send (r, [k], [res]) to the encrypted ResultStore;
11: return es;
Inside the enclave of ResultStore:
12: Update the dictionary via $\mathcal{D}$. add (t, (r, [k], [res])),
where [res] is stored outside enclave for space
efficiency;

---

Algorithm 2 Subsequent Computation in Our Main Design

---

Input:  : A computation func (m) in an application, where
m is the input data; and a metadata dictionary $\mathcal{D}$
managed by the encrypted ResultStore.
Output: Computation result res.
Inside the enclave of an application:
1: t ← Hash (func, m);
2: Send t to the encrypted ResultStore via a secure channel;
3: Obtain true together with (r, [res], [k],) as the
response, which indicates such computation result has
been stored, i.e., (r, [res], [k],) ← $\mathcal{D}$. get (t);
4: h ← Hash (func, m, r);
5: k ← [k] ⊕ h;               // Recover the key
6: res ← AES.Dec (k, [res]);  // Decrypt the result
7: return es;

---

Unlike the single key design, in another embodiment of the invention, when performing the result encryption, the application does not need to use a system-wide secret key. Instead, it uses a randomly generated key via a standard key generation method, i.e., k←AES.KeyGen ($1^\lambda$). Then this random encryption key k is encrypted via XORing a secondary key h, i.e., [k]←k⊕h.

Specifically, to obtain the secondary key h, the DedupRuntime of the application picks a randomness $r \xleftarrow{R} \{0,1\}^*$ as a challenge message, then attaches it with the combination of function's code and input data in, and computes it via Hash (func, in, r). Finally, DedupRuntime needs to send (r, [k], [res]) for updating the metadata of reusable results at the encrypted result store.

Figure 3:
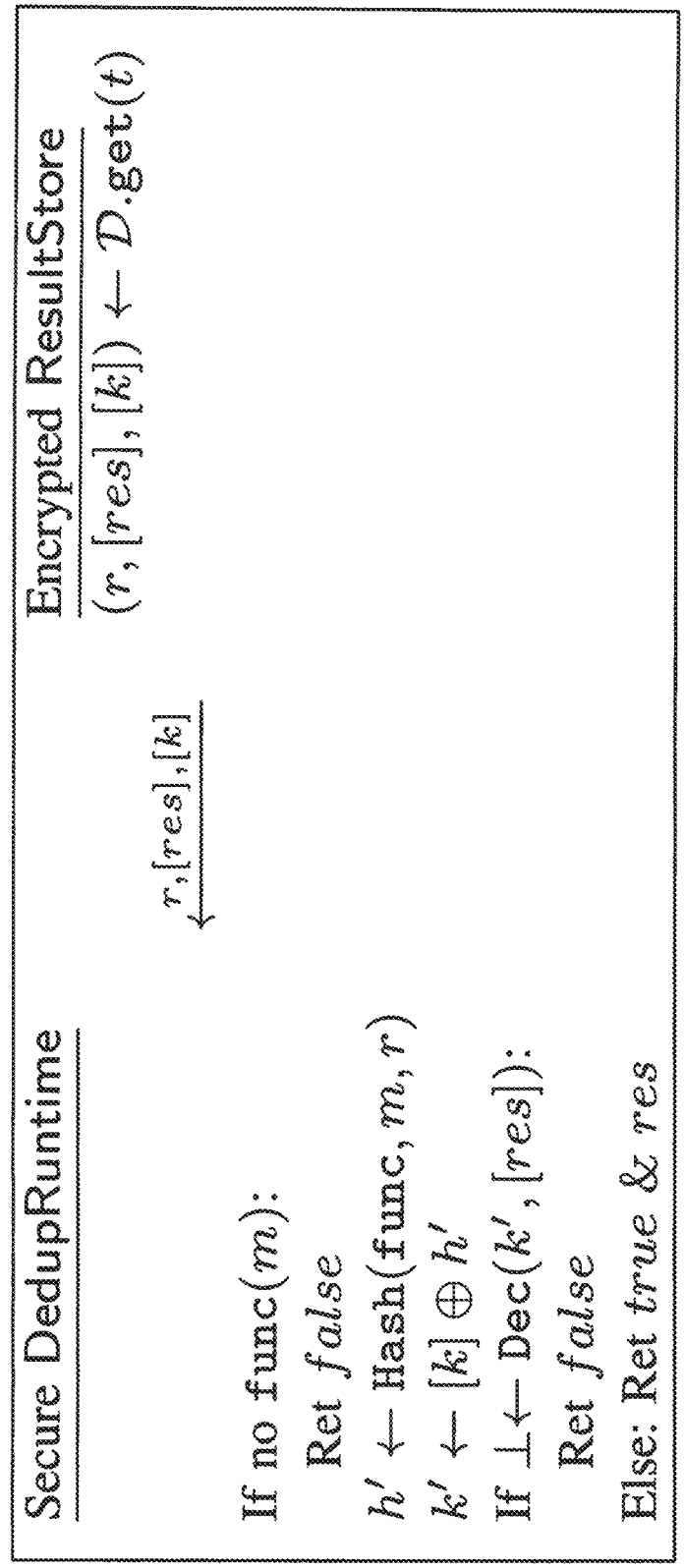
FIG. 3 shows a verification protocol running in enclaves of the method of FIG. 2.

In the illustrated design, the results can still be encrypted with a standard authenticated encryption scheme as the basic design, which protects the m confidentiality and integrity. And this also ensures that the applications, performing the same computation, can always recover the corresponding random encryption key k, so as to decrypt the result ciphertext. But unlike the original RCE scheme, the involved challenge message r further ensures that the encrypted result can be decrypted correctly if and only if the application indeed performs the same computation, i.e., owning the same function's code and input data. And this is verified by DedupRuntime executed in the enclave of the application, as shown in FIG. 3. In brief, if the application is not capable of computing the result by itself, then it cannot succeed in result decryption.

D. Security Analysis

In the following, the security strength of the framework of the present embodiments is analyzed. First of all, the security of the applications relies mainly on hardware enclaves, which guarantees the confidentiality and integrity of involved code, inputs, and results inside the trusted execution environments. Besides, the data traffic outside enclaves, which are involved in the deduplication procedure, such as the tag t, the challenge message r, and the result ciphertext [res], are all encrypted and authenticated with standard cryptographic tools (e.g., AES in GCM mode). And this also prevents the cache poisoning attack, where an adversary attempts to poison ResultStore with bad results.

In the present embodiment, the result encryption scheme is built on RCE scheme, which is a randomized MLE scheme that achieves the best possible privacy for deduplication, i.e., the encryption of an unpredictable message must be indistinguishable from a random string of the same length. The difference lies in two aspects: First, the tag t for computation deduplication is derived from the combination of the function's code and input data, instead of a message as in data deduplication. Second, the secondary key h for protecting the random symmetric encryption key k is computed with an additional challenge message r, which is randomly chosen by the initial computation and securely kept inside enclaves. Therefore, the result ciphertext stored at ResultStore (even outside enclaves) is encrypted and authenticated. Meanwhile, even if a malicious application can obtain the result ciphertext [res] together with [k] and r by using some short information about the computation (i.e., the tag t), it still cannot correctly decrypt them unless it indeed performs the same computation (i.e., owning the same function's code and input data). This allows the framework of the above embodiments to defend against the query forging attack even in a leakage setting where the tag of a computation could be leaked. In summary, the result encryption scheme in the present embodiment does not degrade the security strength of original RCE scheme, but further provides a verification mechanism. So the equality information about the deduplicated computations can be limited to the applications with the same computations.

Additionally, it is noted that the offline brute-force dictionary attack over predictable computation (i.e., both the underlying function's code and its input data are predictable) cannot be launched by an attacker who compromises the machine of ResultStore, because both the tag and the challenge message are protected with hardware enclaves in the target scenario.

Mitigating Denial-of-Service Attacks

To deal with a reasonably high request volume, the design of the encrypted ResultStore of the invention is light-weight. However, a malicious application may issue a large number of "update" requests for polluting the ResultStore with useless results. To defend against it, it is possible to further adopt the rate limiting strategy, which involves a quota mechanism to limit the storage space for each application.

Discussion on Controlled Deduplication

In the above design, an application that performs the same computation can always derive the encryption key, so as to decrypt the corresponding result. However, such "keyless" encryption scheme does not naturally provide flexible access control mechanism. To ensure that only authorized applications can access ResultStore, in some embodiments, an additional authorization mechanism may be provided.

Discussion on Memory Access Pattern

Even though the reusable results are always encrypted outside enclaves, it may still raise the concern of leaking memory access pattern. That is, the clear data inside enclaves (e.g., the result res and the corresponding random key k generated at the application, and the challenge message r stored at ResultStore) may be extracted via software side-channels. This issue can be addressed by integrating existing oblivious memory access solutions, although this inevitably incurs extra overhead.

III. IMPLEMENTATION DETAILS

A. SGX Programming Model

To facilitate the understanding of the method in the above embodiments, a minimal introduction to SGX programming model is provided here. In general, hardening a network application with hardware enclaves requires the developer to reconstruct and recompile the code with Intel® SGX. Specifically, these SGX-enabled applications must be partitioned into two counterparts: a trusted enclave for running critical code on sensitive data, and an untrusted host for running noncritical code and enclave management, such as creation, deconstruction, and communication. The enclave and the host interact with each other via two types of well-defined secure API: ECALL and OCALL. The former is called by the host to enter the enclave, and the latter is called by the enclave to access system utilities that are prohibited inside enclave.

B. Framework Core

At the heart of the SGX-enabled framework of the present embodiment is a secure DedupRuntime for transparently handling the underlying deduplication operations, and an encrypted ResultStore for managing computation results. Remarkably, they are both implemented in a function-agnostic way, so as to minimize the developer effort (see Section III-C). The implementation details of the two major components in the framework of the present embodiment are presented below.

Secure Deduplication Runtime

It implements the main deduplication functionalities, e.g., intercepting marked function calls, querying ResultStore, and retrieving the possibly computation results. As a trusted library linked against application enclaves, most code of DedupRuntime is executed in enclave. It covers a set of function parsers for serialization, and customized OCALLs wrapping request and networking logic.

The main routine of DedupRuntime is to generate a hash tag from the combination of the target function's code and input data for duplicate checking. To achieve this, a direct approach is to connect the code and data together, and then compute the tag via a hash function. But in practice, this might become less effective when considering the difference caused by developer or compiler, e.g., the same code may be compiled into different executable files in different compilation environment. Therefore, to enhance the adaptability, the designed DedupRuntime of the present embodiment takes the following two inputs. The first is the description of a marked function, which includes library family, version number, function signature, and other relevant information, e.g., (libpere, 10.23, int pcre_exec(const pere * code, ... )). With these, DedupRuntime can verify that the application indeed owns the actual code of the function by scanning the underlying trust library, and derive a universally unique value for function identification. The second input of this routine is the input data of the marked function, e.g., a string "abcdaefg ... " and a pattern "a.*a" for matching. Then the hash tag t is computed via Hash (.) with the two inputs. After that, the control is passed to an OCALL, which prepares and sends a GET_REQUEST with t to ResultStore.

In the present embodiment, synchronous communication is implemented. So the same OCALL needs to wait until receiving corresponding GET_RESPONSE replied by ResultStore. Once the OCALL returns and the control switches back to enclave, if the response is positive, the associated data will be parsed, verified and decrypted. Otherwise, the input function is parsed and executed (Note that the required library itself (e.g., libpere) should be m available as a trusted library, i.e., properly ported, at the applications); the results are authenticated, encrypted, and sent to the ResultStore as an asynchronous PUT_REQUEST via another OCALL in a similar way.

It is noted that the parsers, OCALLs and related data structures (e.g., XXX_REQUEST and XXX_RESPONSE) are implemented in a function-agnostic way with uniform serialization interface, so they are capable of handling different functions intended for deduplication. To support new function, for example from another trusted library, the only step is to associate it with a proper parser from existing ones, or create a new one with customized serialization for the new function's input/output.

Encrypted Result Store

The implementation of ResultStore is relatively straightforward. The key data structure used here is an enclave-protected dictionary storing previous computation results keyed by the tag t. To maximize the utility of limited enclave memory, the dictionary entry is designed to be small; it maintains some metadata (e.g., challenge message r and authentication MAC), and a pointer to the real result ciphertexts that are kept outside enclave.

Unlike DedupRuntime, the main body of encrypted ResultStore runs outside enclave. Upon receiving a request, it first applies preliminary parsing on it, and then delegates it to one of two customized ECALLs dependent on whether it is a GET_REQUEST or PUT_REQUEST. The duty of the ECALL is to marshal data at enclave boundary and access the dictionary inside enclave. After it returns, ResultStore prepares a corresponding GET_RESPONSE or PUT_RESPONSE, which is sent back to the requesting DedupRuntime.

To further reduce the query latency, in one example, ResultStore may be deployed at the same machine of the network applications. A master ResultStore may be deployed on a dedicated server, which periodically synchronizes the popular (i.e., frequently appeared) results from different machines. Hence, the application may not be able to access the latest computed results from others on different machines, and needs to compute and encrypt the result with a self-selected random key. Nevertheless, this will not cause redundancy as the tags of underlying computations are deterministic, therefore only one version of result ciphertext (associated with corresponding [k] and t) needs to be stored.

C. API and Use Cases

To ease the use of the deduplication framework of the present embodiment, there is provided a developer-friendly and expressive API to developers of network applications. The API is centered on a deduplicable object, which wraps the interaction with underlying trusted DedupRuntime, conversion between data formats, and all other intermediate operations. The present example uses extensive C++ template features in the design and implementation of Deduplicable, allowing it to accept, in principle, any functions. To make a function deduplicable, the developer only needs to create a Deduplicable version by providing the aforementioned simple description, and then uses the new version as normal. This usually requires change of only 2 lines of code. FIG. 4 shows two related examples.

IV. EXPERIMENTAL EVALUATION

Two network applications were selected and ported to SGX enclaves to comprehensively examine the performance of the method in the above embodiment.

A. Experiment Setup

All experiments were run on an SGX-enabled machine with Intel® Xeon E3-1505 vs. (4 cores@2.80 GHz, 8 MB cache) with 16 GB of RAM, where the OS is Ubuntu 16.04 LTS and the SGX SDK is v1.8. Besides, gcc-5.4.0 was used to compile the SGX applications, and the enclave memory was set to the maximum 128 MB (90 MB usable). Regarding the required collision-resistant hash function and authenticated encryption scheme, SHA-256 and AES-GCM-128 were used respectively, and both are provided by the crypto library shipped with SGX SDK.

For demonstration, two popular applications in existing middleboxes were m selected and ported to SGX enclaves. The first one is traffic compression, which often appears in bandwidth optimizers. The second one is pattern matching, which often appears in intrusion detection systems. And the exact functions to be deduplicated are deflate(.) from the library zlib and pcre_exec(.) from the library libpere respectively. Regarding the test data, different sized inputs were randomly selected from the Boost Library. All experimental results represent the mean of 10 trials.

B. Evaluation

Developer Effort

To make a function deduplicable with the method in the present embodiment, the developer needs to convert the original function call into the Deduplicable version. As an example, FIG. 4 shows the actual modifications of two deduplicable functions in the selected applications. Recall that the present embodiment mainly targets the functions that will be executed in trusted environments, i.e., the original function should come from an SGX-enabled trusted library, provided by a third party or the developer herself. Nevertheless, it should be emphasized that this kind of development effort is inevitable if the function will be run inside the enclaves. Therefore, to deduplicate a wide range of computations in trusted enclaves, it only requires very little modifications, as few as 2 lines of code per function call.

Cryptographic Operations

To better understand the latency introduced to the application when applying the SGX-enabled computation deduplication framework of the present embodiment, an exemplary evaluation of the performance of the major cryptographic operations in the secure DedupRuntime is provided. As shown in Table I, the processing times of these operations are in linear to the size of input data, and the potential overhead is relatively small because the selected schemes are efficient. For example, it takes about 1.198 ms to generate a tag from a function with 100 KB input data, and another 1.169 ms to recover the encryption key (shortened as "Key Rec.") if the result can be found. Meanwhile, the result m encryption and decryption (the last two columns) are even faster with the same sized input, literally an order of magnitude. In addition, it is noted that once the result is computed by the application in the case of initial computation, the remaining "PUT" operations (including key generation and protection (shortened as "Key Gen."), result encryption, and update at ResultStore) can be processed in a separated thread for better efficiency.

TABLE 1

EXEMPLARY EVALUATION OF CRYPTOGRAPHIC OPERATIONS IN DEDUPLICATION RUNTIME UNDER FOUR DIFFERENT SIZED INPUT

| Input (KB) | Tag Gen. (ms) | Key Gen. (ms) | Key Rec. (ms) | Result Enc. (ms) | Result Dec. (ms) |
| --- | --- | --- | --- | --- | --- |
| 1 | 0.028 | 0.062 | 0.048 | 0.015 | 0.021 |
| 10 | 0.186 | 0.159 | 0.145 | 0.031 | 0.022 |
| 100 | 1.198 | 1.182 | 1.169 | 0.188 | 0.049 |
| 1024 | 6.008 | 2.779 | 2.775 | 1.731 | 0.257 |

Throughput Evaluation

Figure 5:
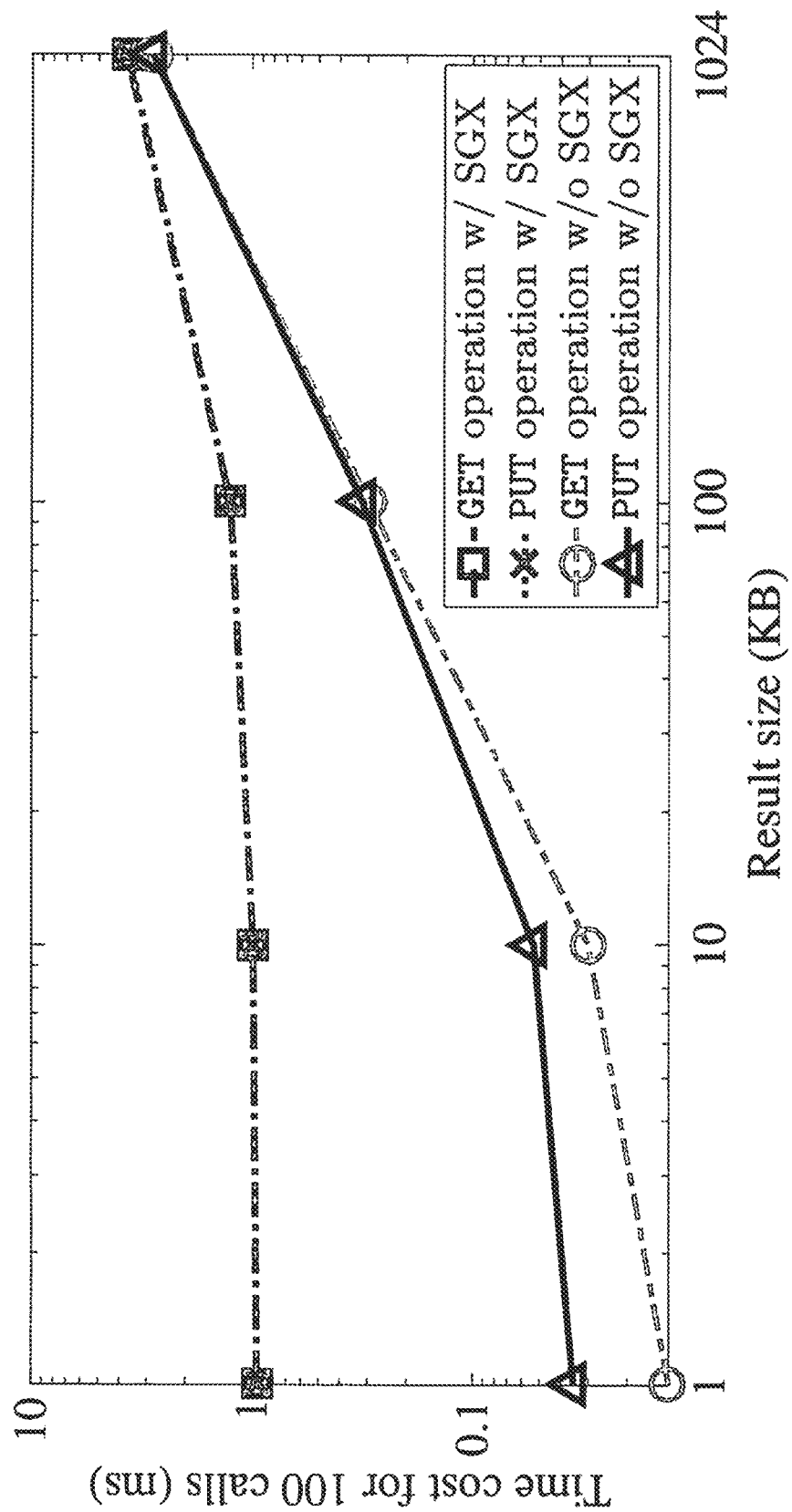
FIG. 5 is a graph showing throughput evaluation and comparison of two major operations of ResultStore (both operations are with SGX) using the method for accelerating execution of application in a trusted execution environment in one embodiment of the invention.

To evaluate the throughput of the encrypted ResultStore, four different sized data (from 1 KB to 1 MB) were used to measure the time cost of processing the two types of request, i.e., GET_REQUEST and PUT_REQUEST. FIG. 5 shows the time cost of processing 100 times of each operation at ResultStore, where the incoming data are all different. It can be shown that the both operations with SGX (i.e., the upper two lines) are very fast, and quite close. Meanwhile, FIG. 5 also shows the performance of the same operations without using SGX technique, i.e., running outside enclaves. From the results, it can be observed that the speed of each operation with SGX is relatively slower when facing a small sized result, e.g., 1 KB. The additional cost in SGX comes from the underlying control switches in OCALL and ECALL as mentioned in Section III-B, and the gap is getting smaller with the growth of result size. To mitigate such overhead, off-the-shelf system-level optimization techniques, e.g., asynchronous system call mechanism or exit-less remote procedure call mechanism, can be further adopted.

Application Performance

To demonstrate the effectiveness of the method in the present embodiment, the running time of the two exemplary applications were compared in three cases: without using the framework of the embodiment (the baseline); initial computation with using the framework of the embodiment ("w/o Dedup."); and subsequent computation with using the framework of the embodiment ("w/ Dedup.").

Figure 6B:
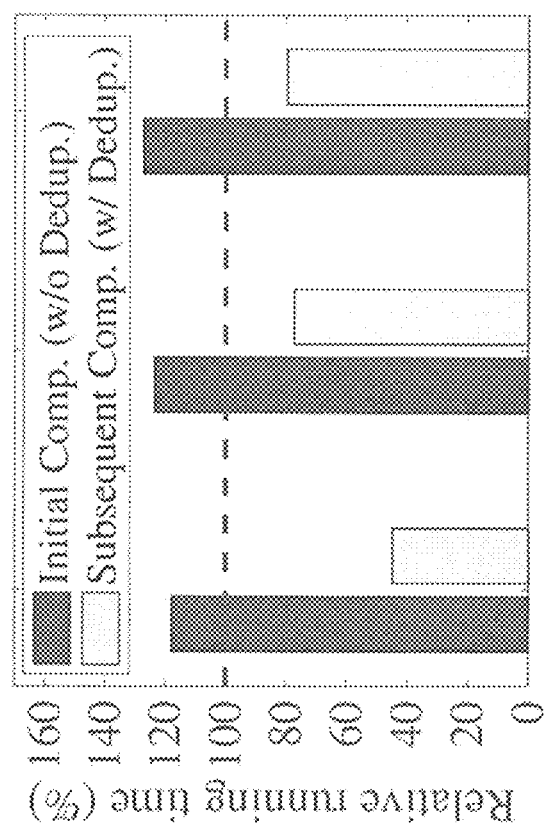
FIG. 6B is graph showing relative runtime of pattern matching application under different input size for the application execution acceleration method in one embodiment of the invention.
Figure 6A:
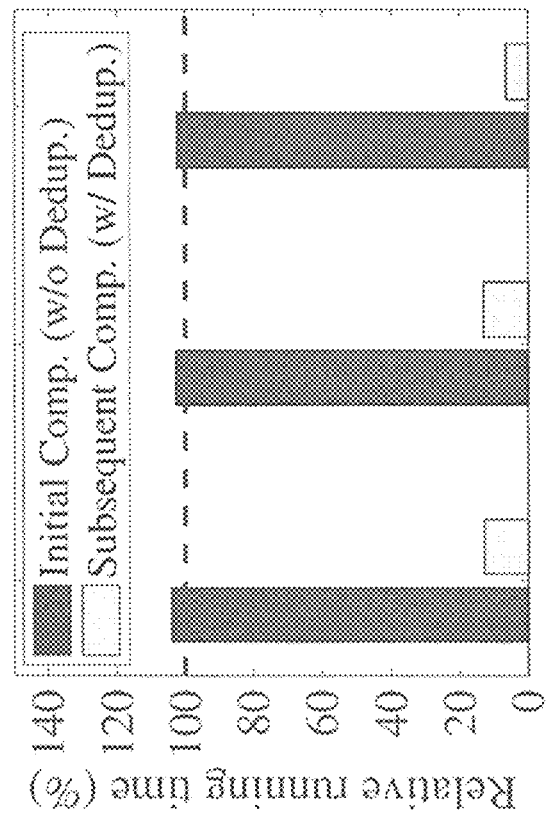
FIG. 6A is graph showing relative runtime of traffic compression application under different input size for the application execution acceleration method in one embodiment of the invention.

FIGS. 6A-6B show the relative running time comparison under different input size, e.g., about 7.7-15× speedup for the traffic compression, but only 1.2-2.2× speedup for the pattern matching. It can be shown that the traffic compression benefits more from the deduplication procedure, and the involved overhead for the initial computation is quite small (less than 4%), compared with the pattern matching (about 15%-21%). This is because the compression algorithm is relatively slow, but the speed of the pattern matching is really fast (even with a complex pattern in the test) that is on the same level as the introduced cryptographic operations (as shown in Table I). Thus, it would be more suitable for deduplicating a time-consuming function in practice, which could be a single but complex computational algorithm or a sequence of processing tasks. Finally, it is noted that the method in the above embodiment is with maximum generality and extensibility, which allows the developers to deduplicate their rich computations in SGX context.

V. CONCLUSION

The method in the above embodiments provides a generic framework that enables secure computation deduplication over SGX-enabled network applications. It enables these applications to identify redundant computations and reuse computation results, while protecting the confidentiality and integrity of the involved code, inputs, and results. To maximize the result utilization, the m extended cross-application deduplication scheme in the above embodiments empowers other applications to securely utilize the shared results, without sharing a system-wide key. The embodiments of the invention also provide an expressive API for developers to deduplicate rich computations with minimal effort, as few as 2 lines of code per function call. Extensive evaluations of two popular network applications demonstrated that the proposed embodiments of the invention can provide up to 15× speedup for those time-consuming computations. The method in the above embodiments provides a secure, generic, and developer-friendly software framework for accelerating hardware-assisted trustworthy network applications, especially for those computation-intensive ones, e.g., traffic compression systems. The method in the embodiment has further potential benefits for applications running in trusted execution environments beyond the network context.

VI. RELATED HARDWARE

Figure 7:
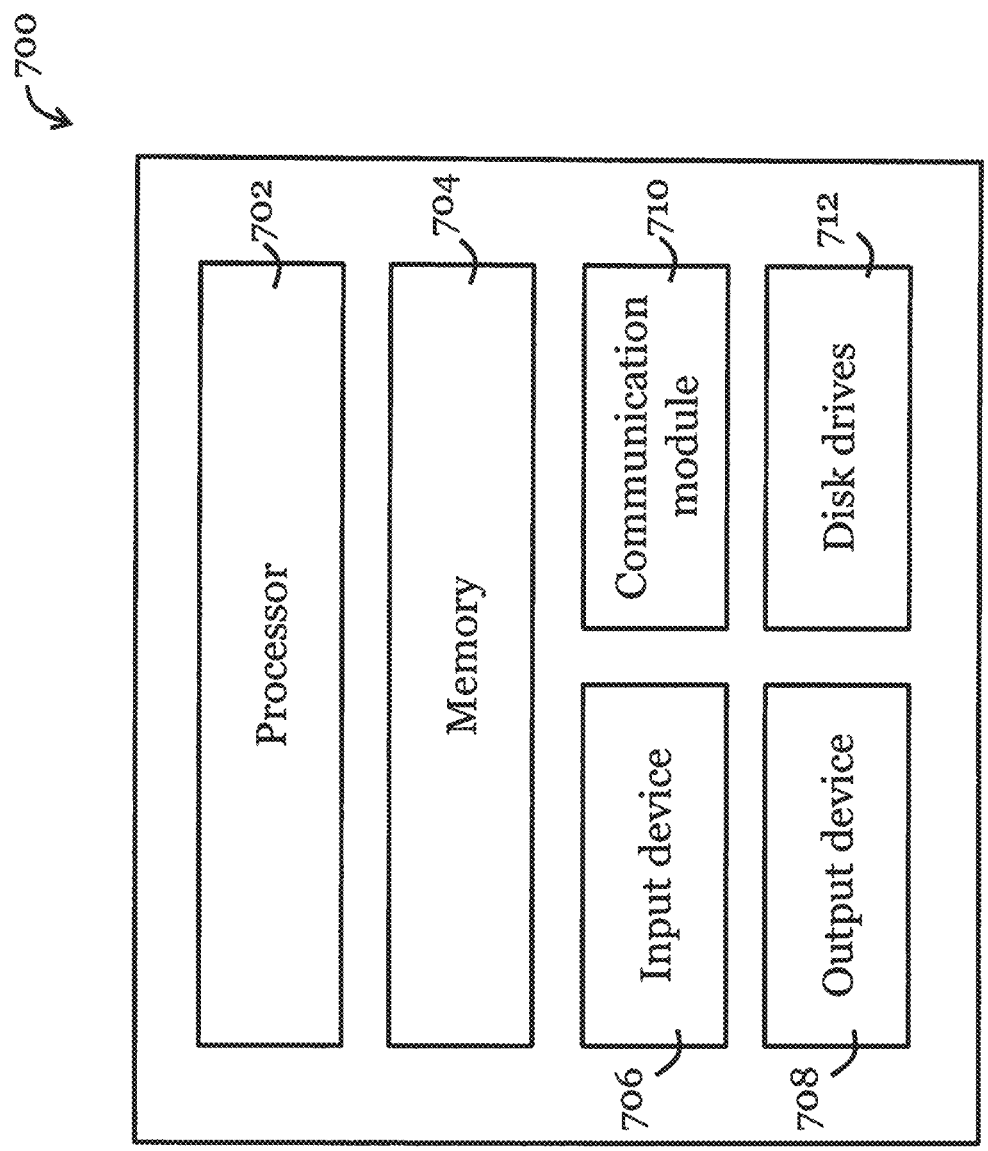
FIG. 7 is a functional block diagram of an information handling system operable to operate the method in one embodiment of the invention.

Referring to FIG. 7, there is shown a schematic diagram of an exemplary information handling system 700 that can be used for operating the method in one embodiment of the invention. In some embodiments, the information handling system 700 may have different configurations, and it generally comprises suitable components necessary to receive, store and execute appropriate computer instructions or codes. The main components of the information handling system 700 are a processing unit 702 and a memory unit 704. The processing unit 702 is a processor such as a CPU, an MCU, etc. The memory unit 704 may include a volatile memory unit (such as RAM), a non-volatile unit (such as ROM, EPROM, EEPROM and flash memory) or both. In some embodiments, the information handling system 700 further includes one or more input devices 706 such as a keyboard, a mouse, a stylus, a microphone, a tactile input device (e.g., touch sensitive screen) and a video input device (e.g., camera). The information handling system 700 may further include one or more output devices 708 such as one or more displays, speakers, disk drives, and printers. The displays may be a liquid crystal display, a light emitting display or any other suitable display that may or may not be touch sensitive. The information handling system 700 may further include one or more disk drives 712 which may encompass solid state drives, hard disk drives, optical drives and/or magnetic tape drives. A suitable operating system may be installed in the information handling system 700, e.g., on the disk drive 712 or in the memory unit 704 of the information handling system 700. The memory unit 704 and the disk drive 712 may be operated by the processing unit 702. The information handling system 700 also preferably includes a communication module 710 for establishing one or more communication links (not shown) with one or more other computing devices such as a server, personal computers, terminals, wireless or handheld computing devices. The communication module 710 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. In some embodiments, the processing unit 702, the memory unit 704, and optionally the input devices 706, the output devices 708, the communication module 710 and the disk drives 712 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. In some embodiments, the information handling system 700 also includes at least one enclave with a hardware-enforced protected region of an address space of the memory 704.

A person skilled in the art would appreciate that the information handling system 700 shown in FIG. 7 is merely exemplary, and that different information handling systems may have different configurations and still be applicable in the invention. Also, the invention may be operated in hardware, software, or combination of both, implemented on one or more information handling systems such that that shown in FIG. 7.

Although not required, the embodiments described with reference to the Figures can be implemented as an application programming interface (API) or as m a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method for accelerating execution of a Software Guard Extensions (SGX) enabled application in a trusted enclave, comprising:
    generating a hash tag (t) based on library family, version number, and function signature of computer instructions associated with a function of an SGX enabled application and associated input data, for representation of a computation to be performed by the SGX enabled application;
    determining whether the same computation has been performed before by determining whether the hash tag (t) corresponds to an entry in a database arranged outside the trusted enclave, the database including an enclave maintaining a metadata dictionary, the metadata dictionary storing one or more entries each including a hash tag (t), an associated randomness parameter (r), an associated encrypted random encryption key ([k]), and a pointer to an associated encrypted computation result ([res]);
    if a corresponding entry of the hash tag (t) is found in the database, which indicates that the same computation has been performed before, then:
        obtaining, from the entry of the hash tag (t), a randomness parameter (r), an encrypted random encryption key ([k]), and a pointer to an encrypted computation result ([res]) associated with the hash tag (t);
        determining a key (h) based on: the randomness parameter (r), the library family, version number, and function signature of the computer instructions associated with the function of the SGX enabled application, and the associated input data;
        decrypting the encrypted random encryption key ([k]) using the determined key (h) to obtain a random encryption key (k);
        decrypting the encrypted computation result ([res]) using the random encryption key (k); and
        retrieving the corresponding computation result (res) without performing the computation; and
    if a corresponding entry of the hash tag (t) is not found in the database, which indicates that the same computation has not been performed before, then:
        performing the computation to obtain a computation result (res);
        storing the computation result (res);
        encrypting the computation result (res) with a random encryption key (k) to obtain an encrypted computation result ([res]);
        encrypting the random encryption key (k) with a further encryption key (h) to obtain an encrypted random encryption key ([k]), wherein the further encryption key (h) is generated based on the library family, version number, and function signature of the computer instructions of the function associated with the SGX enabled application, the associated input data, and a randomness parameter (r); and
        including, in the metadata dictionary, an entry having the hash tag (t) and the randomness parameter (r), the encrypted random encryption key ([k]), and a pointer to the encrypted computation result ([res]) associated with the hash tag (t).

2. The method of claim 1, wherein the encrypted computation result is stored outside the enclave of the database.

3. The method of claim 1, wherein the database is encrypted.

4. The method of claim 1, further comprising sending the generated hash tag (t) to the database via a secured channel.

5. A system for accelerating execution of a Software Guard Extensions (SGX) enabled application in a trusted enclave, the system comprising one or more processors arranged to:
    generate a hash tag (t) based on library family, version number, and function signature of computer instructions associated with a function of an- SGX enabled application and associated input data, for representation of a computation to be performed by the SGX enabled application;
    determine whether the same computation has been performed before by determining whether the hash tag (t) correspond to any entry in a database arranged outside the trusted enclave, the database including an enclave maintaining a metadata dictionary, the metadata dictionary storing one or more entries each including a hash tag (t) an associated randomness parameter (r), an associated encrypted random encryption key ([k]), and a pointer to an associated encrypted computation result ([res]);
    perform the following operations if a corresponding entry of the hash tag (t) is found in the database, which indicates that the same computation has been performed before:
        obtain, from the entry of the hash tag (t), a randomness parameter (r), an encrypted random encryption key ([k]), and a pointer to an encrypted computation result ([res]) associated with the hash tag (t);
        determine a key (h) based on the randomness parameter (r), the library family, version number, and function signature of the computer instructions associated with the function of the SGX enabled application, and the associated input data;
        decrypt the encrypted random encryption key ([k]) using the determined key (h) to obtain a random encryption key (k);
        decrypt the encrypted computation result ([res]) using the random encryption key (k); and
        retrieve the corresponding computation result (res) without performing the computation; and
    perform the following operations if a corresponding entry of the hash tag (t) is not found in the database, which indicates that the same computation has not been performed before:

perform the computation to obtain a computation result (res);

store the computation result (res);

encrypt the computation result (res) with a random encryption key (k) to obtain an encrypted computation result ([res]);

encrypt the random encryption key (k) with a further encryption key (h) to obtain an encrypted random encryption key ([k]), wherein the further encryption key (h) is generated based on the library family, version number, and function signature of the computer instructions of the function associated with the SGX enabled application, the associated input data, and a randomness parameter (r); and include, in the metadata dictionary, an entry having the hash tag (t) and the randomness parameter (r), the encrypted random encryption key ([k]), and a pointer to the encrypted computation result ([res]) associated with the hash tag (t).

6. The system of claim 5, wherein the encrypted computation result is stored outside the enclave of the database.

7. A non-transitory computer readable medium storing computer instructions that, when executed by one or more processors, causes the one or more processors to perform a method for accelerating execution of a Software Guard Extensions (SGX) enabled application in a trusted enclave, comprising:

generating a hash tag (t) based on library family, version number, and function signature of computer instructions associated with a function of the SGX enabled application and associated input data, for representation of a computation to be performed by the SGX enabled application;

determine whether the same computation has been performed before by determining whether the hash tag (t) correspond to an entry in a database arranged outside the trusted enclave, the database including an enclave maintaining a metadata dictionary, the metadata dictionary storing one or more entries each including a hash tag (t), an associated randomness parameter (r), an associated encrypted random encryption key ([k]), and a pointer to an associated encrypted computation result ([res]);

if a corresponding entry of the hash tag (t) is found in the database which indicates that the same computation has been performed before, then:

obtaining, from the entry of the hash tag (t), a randomness parameter (r), an encrypted random encryption key ([k]), and a pointer to an encrypted computation result ([res]) associated with the hash tag (t);

determining a key (h) based on the randomness parameter (r), the library family, version number, and function signature of the computer instructions associated with the function of the SGX enabled application, and the associated input data;

decrypting the encrypted random encryption key ([k]) using the determined key (h) to obtain a random encryption key (k);

decrypting the encrypted computation result ([res]) using the random encryption key (k); and retrieving the corresponding computation result (res) without performing the computation represented by the hash tag (t); and if a corresponding entry of the hash tag (t) is not found in the database which indicates that the same computation has not been performed before, then:

performing the computation to obtain a computation result (res);

storing the computation result (res);

encrypting the computation result (res) with a random encryption key (k) to obtain an encrypted computation result ([res]);

encrypting the random encryption key (k) with a further encryption key (h) to obtain an encrypted random encryption key ([k]), wherein the further encryption key (h) is generated based on the library family, version number, and function signature of the computer instructions of the function associated with the SGX enabled application, the associated input data, and a randomness parameter (r); and including, in the metadata dictionary, an entry having the hash tag (t) and the randomness parameter (r), the encrypted random encryption key ([k]), and a pointer to the encrypted computation result ([res]) associated with the hash tag (t).

8. The non-transitory computer readable medium of claim 7, wherein the encrypted computation result is stored outside the enclave of the database.

* * * * *